US008710450B2

(12) United States Patent
Ryan

(10) Patent No.: US 8,710,450 B2
(45) Date of Patent: Apr. 29, 2014

(54) TRI-MATERIAL DUAL-SPECIES NEUTRON SPECTROMETER

(75) Inventor: James M. Ryan, Lee, NH (US)

(73) Assignee: University of New Hampshire, Durham, NH (US)

( * ) Notice: Subject to any disclaimer, the term of this patent is extended or adjusted under 35 U.S.C. 154(b) by 315 days.

(21) Appl. No.: 13/373,026

(22) Filed: Nov. 2, 2011

(65) Prior Publication Data

US 2014/0014842 A1 Jan. 16, 2014

Related U.S. Application Data

(60) Provisional application No. 61/409,779, filed on Nov. 3, 2010.

(51) Int. Cl.
*G01T 3/06* (2006.01)
*G01T 1/20* (2006.01)
*G01T 1/203* (2006.01)

(52) U.S. Cl.
CPC ................ *G01T 3/06* (2013.01); *G01T 1/2008* (2013.01); *G01T 1/203* (2013.01)
USPC ..................................... 250/390.11; 250/367

(58) Field of Classification Search
CPC ........ A61B 6/4258; G01T 1/20; G01T 1/202; G01T 1/203; G01T 1/2008; G01T 3/00; G01T 3/06
USPC ............ 250/361 R, 362, 367, 390.01, 390.11
See application file for complete search history.

(56) References Cited

U.S. PATENT DOCUMENTS

| | | | |
|---|---|---|---|
| 4,415,808 | A | 11/1983 | Cusano et al. |
| 7,772,558 | B1 | 8/2010 | Nagarkar et al. |
| 2004/0251420 | A1 | 12/2004 | Sun |
| 2008/0001096 | A1 | 1/2008 | Smither |
| 2008/0315109 | A1 | 12/2008 | Stephan et al. |
| 2010/0006769 | A1 | 1/2010 | Kraft et al. |
| 2010/0067001 | A1 | 3/2010 | Corbeil et al. |
| 2010/0252741 | A1 | 10/2010 | Zaitseva et al. |

*Primary Examiner* — Mark R Gaworecki

(74) *Attorney, Agent, or Firm* — Devine, Millimet & Branch; Paul C. Remus; Kimberly A. Peaslee

(57) ABSTRACT

A system of the present invention is capable of detecting, imaging and measuring both neutrons and gamma rays. The system has three parallel plates each containing a plurality of detectors. Each plate has different detectors. The first plate has plastic scintillation detectors. The second plate has a plurality of stilbene scintillation detectors having pulse-shape discrimination (PSD) properties. The third plate has a plurality of inorganic detectors. The first plate and the second plate are used in connection to detect, image and measure neutrons. The second plate and the third plate are used in connection to detect, image, and measure gamma rays.

13 Claims, 6 Drawing Sheets

20
24
$D_1$
n detection
26
$D_2$
r detection
$D_3$
28
34
Electronics and processing
r
30
34
38
22

TRI-MATERIAL DUAL-SPECIES NEUTRON SPECTROMETER

CROSS-REFERENCE TO RELATED APPLICATIONS

The present application claims the benefit of Provisional Patent Application Ser. No. 61/409,779 filed Nov. 3, 2010, which is incorporated herein by reference.

STATEMENT REGARDING FEDERALLY SPONSORED RESEARCH OR DEVELOPMENT

This invention was made with government support under Defense Threat Reduction Center, contract HDTRA1-08-C-0077. The government has certain rights in the invention.

FIELD OF THE INVENTION

This invention relates to an imaging neutron spectrometer and, in particular, a spectrometer for real-time neutron source location and identification.

BACKGROUND OF THE INVENTION

There are several applications for conventional neutron imager/spectrometers. However, all applications revolve around detecting, locating, monitoring, and identifying nuclear material.

Neutrons are, by their nature, resistant to detection, and defy easy imaging and spectroscopy. Detection has mostly been in the form of registering moderated or thermalized neutrons from a fast neutron source. Because one only measures the charged particles produced by a neutron interaction, deducing the properties of the parent neutron is ambiguous, besides being difficult.

Registering moderated neutrons comes without any information about the incident direction or energy. Measuring fast neutrons in a bulk detector provides a compromised energy measurement, but still lacks directional information. A double-scatter telescope pays the penalties of greatly increased complexity and low efficiency by requiring two neutron scatters, but it benefits in the end because the elastic scatter kinematics can be used to constrain the incident velocity vector while simultaneously performing a quality energy measurement.

SUMMARY OF THE INVENTION

The system of the present invention is capable of detecting, imaging, and measuring both neutrons and gamma rays. The system has as many as three parallel plates each containing a plurality of detectors. Each plate has different detectors. The first plate has a plurality of plastic scintillation detectors. The second plate has a plurality of stilbene scintillation detectors having pulse-shape discrimination (PSD) properties. The third plate has a plurality of inorganic detectors. The first plate and the second plate are used in connection to detect, image, and measure neutrons. The second plate and the third plate are used in connection to detect, image, and measure gammas.

The present invention is a system for imaging and measuring neutrons. The system includes a frame, a pair of parallel plates carried by the frame, and an electronic and processing unit. Each of the parallel plates carries a plurality of detectors. The detectors are electronically connected to the electronic and processing unit. The detectors of one of the parallel plates are plastic scintillation detectors. The detectors of the other parallel plate are stilbene scintillation detectors. The detectors detect neutrons and the electronic and processing unit determines the path of the neutrons based on interaction with one of the plurality detectors in one of the parallel plates and then interaction with one of the plurality detectors in the other parallel plate.

In an embodiment, the system includes a third plate parallel to the pair of plates and not between them. The third plate has a plurality of detectors wherein the system images and measures neutrons and gamma rays.

In an embodiment, the detectors in the third plate are inorganic scintillation detectors. In an embodiment, the inorganic scintillation detectors are sodium iodide (NaI).

In an embodiment, a system for imaging and measuring neutrons and gamma rays includes a frame, three parallel plates carried by the frame, and an electronic and processing unit. Each of the parallel plates carries a plurality of detectors. The detectors are electronically connected to the electronic and processing unit. The detectors on each of the parallel plates may be non-liquid or liquid scintillation detectors. The detectors detect neutrons and the electronic and processing unit determines the path of the neutrons based on interaction with one of the plurality detectors in the first of the parallel plates and then interaction with one of the plurality detectors in the second of the parallel plates and the detectors detect gamma rays based on interaction with one of the plurality detectors in the second of the parallel plates and then interaction with one of the plurality detectors in the third of the parallel plates.

In an embodiment, the detectors on each of the parallel plates are non-liquid scintillation detectors.

In an embodiment, each of the detectors on the third of the three plates is an inorganic scintillation detector. In an embodiment, each of the detectors on the second of the three plates is capable of pulse-shape discrimination.

In an embodiment, each of the detectors on the first of the three plates is a plastic scintillation detector and each of the detectors on the second of the three plates is a stilbene scintillation detector.

In an embodiment, each of the detectors on the third of the three plates is an inorganic scintillation detector. In an embodiment, each of the detectors on the third of the three plates is made of sodium iodide (NaI).

These aspects of the invention are not meant to be exclusive and other features, aspects, and advantages of the present invention will be readily apparent to those of ordinary skill in the art when read in conjunction with the following description, appended claims and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
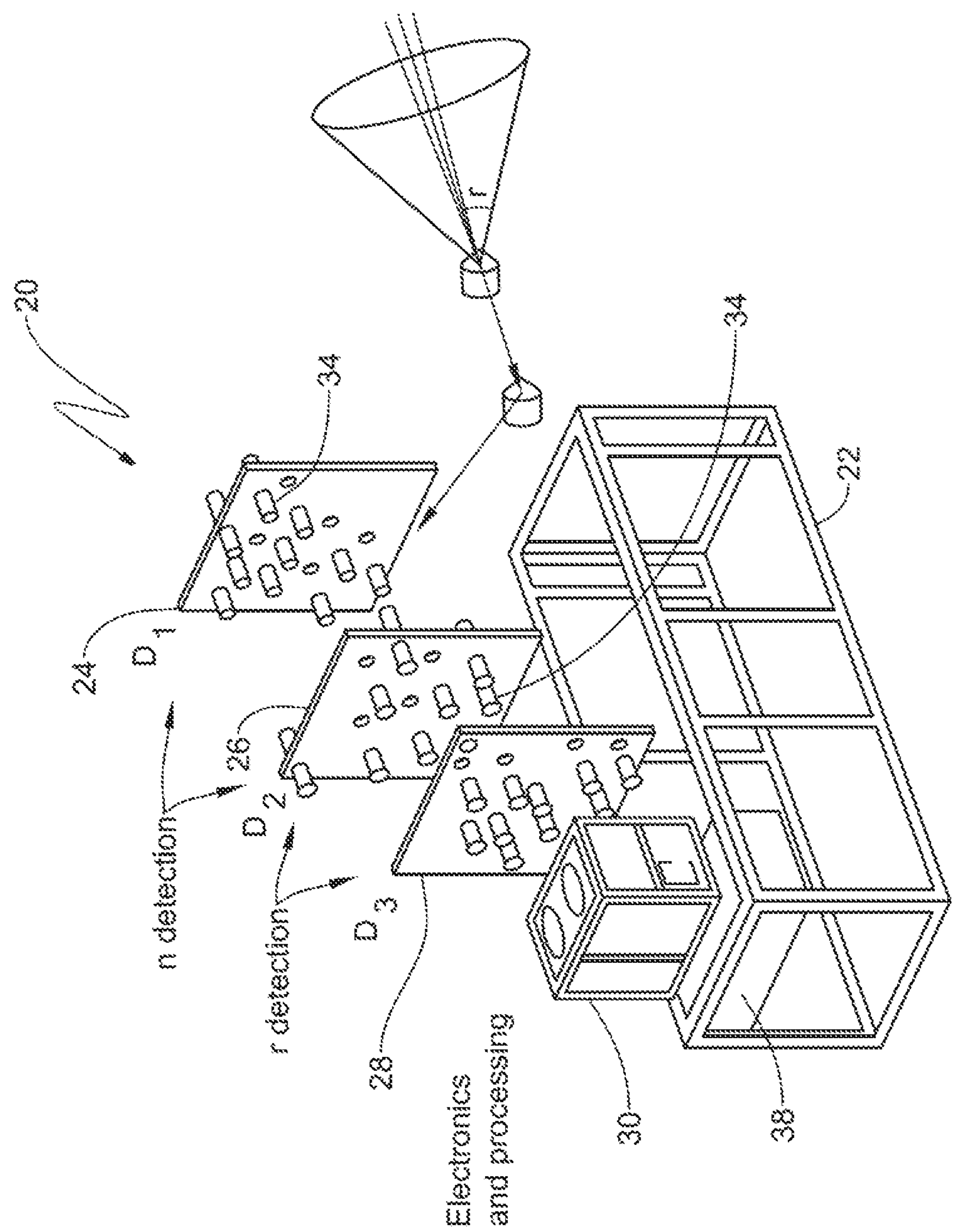
FIG. 1 is a perspective view of an imaging neutron spectrometer system.

Referring to FIG. 1, an imaging neutron spectrometer 20 is shown. The system is capable of imaging and measuring both neutron and gamma sources remotely. Remotely imaging and measuring in the present system is done without touching the source.

The spectrometer 20 has a frame 22 and three parallel detecting plates or planes 24, 26, and 28, and an electronic and processing unit 30. The preferred embodiment of system 20 is designed to be portable as described below in more detail.

The detecting plates or planes 24, 26, and 28 are each parallel to each other. Each panel has a plurality of detectors 34. Each detector 34 is a scintillation detector. A scintillation detector or counter 34 produces a flash of light (scintillation) in a fluorescent material by an ionizing radiation which is detected and counted by a multiplier phototube and associated circuits 30.

Each of the detecting plates 24, 26, and 28 has detectors 34 which are different from those of other plates and performs the detectors 34 own special function.

The three plates 24, 26, and 28 form a stack in which MeV-range nuclear neutron and gamma radiation can be detected. The detectors 34 of the first plate 24 have a plastic scintillator that acts as part of the neutron imaging system and to a much lesser degree the gamma imaging system. The detectors 34 of the second plate 26 employ stilbene [$C_6H_5CH$:$CHC_6H_5$] that possesses pulse-shape-discrimination (PSD) properties. Neutrons are scattered first in the first plate 24 by the plastic scintillator detectors 34 and then further scattered in the second plate 26 by the stilbene detectors 34 in a double-scatter arrangement. The PSD signal from the stilbene is used preferentially to select neutron interactions.

The present invention, in contrast to conventional two plate arrangements of the stilbene detectors 34 of the second plate 26 and plastic scintillator detectors 34 of the first plate 24, allows the system to be used also for the gamma imaging. The gamma imaging uses the second plate 26, with the stilbene detectors 34, and the third plate 28. Each of the detectors 34 of the third plate 28 is an inorganic scintillator. In a preferred embodiment, the detector is sodium iodide (NaI).

The second plate 26 with the stilbene detectors 34 is a key component of the gamma imaging system, providing the necessary PSD measurement to maximize signal to noise for both detection systems.

The stilbene detectors 34 of the second plate 26 are shared by the gamma and neutron imaging systems. The stilbene provides the neutron/gamma identification to maximize the signal to noise ratio for both systems. As indicated above, the system uses solid scintillators in contrast to liquid scintillators such as mineral oil. The solid scintillators allow for a more rugged portable system 20.

As indicated above, the three parallel detecting plates 24, 26, and 28 each have a plurality of detectors 34. The same style detector 34 is used throughout the plate, but is different from the detectors in the other plates. The order of detectors 34 from top to bottom (i.e., first plate to third plate) is plastic scintillator, stilbene, and inorganic scintillator 34.

The actual neutron measurements employ the scintillation amplitude in the plastic scintillators and the time-of-flight from the plastic to the stilbene detectors. A gamma signal in the stilbene can be used to reject events. The gamma measurements use the scintillation amplitude in both the stilbene and the inorganic scintillators with the time-of-flight used to reject neutrons. A neutron signal in the stilbene would be required to accept an event. An event occurs when there is a signal in at least two of the three detecting planes.

As indicated above, the system 20 is capable of measuring both neutrons and gamma rays. The neutron and gamma emissions are related and can be used together for increased knowledge of the source of radiation environment. The system 20 is a pair of double scatter cameras. The first plate 24 and the second plate 26 are the double scatter camera for the neutrons. The second plate 26 and the third plate 28 are the double scatter camera for the gamma emissions. Whether it be a neutron or a gamma, the idea is that a particle scatters once in a forward detector after which it sometimes scatters in a rearward detector. A neutron or a gamma can pass through any of these detectors 34 without any interaction. These particles interact in a probabilistic fashion. The thickness of these detectors is selected to be thick enough to register a reasonable fraction of particles, but not so thick that they interact twice.

The difference between the two double scatter cameras is that the ideal scattering or detection medium for neutrons, the detectors 34 in the second plate 26, also happens to be an excellent forward scatterer for gamma rays. Such a material is an organic substance rich in hydrogen. Thus, for a neutron camera, one constitutes the camera with an organic scintillator for both the forward and rearward scatterers. The neutron energy is measured by summing the energy the neutron deposits in the forward detector and the energy of the recoiling neutron measured by the travel time to the rearward detector.

The situation for gamma rays is different in that all gamma rays travel with the same speed, so that no energy information is gleaned from time-of-flight. Instead, one must capture the gamma ray in entirety, requiring a thick detector, typically made of a dense inorganic scintillator, such as the detector 34 in the third plate 28. The hydrogen content of a gamma-ray detector is not important. It must just be thicker than the interaction length of the gamma ray in that medium.

The neutron scatter camera of the system 20 has two plates of organic scintillation detectors; the first plate 24 and the second plate 26.

In that it is preferred for gamma ray detection to have an inorganic scintillation detector 34, the third plate 28 has high density inorganic scintillators. The middle plate 26 with the stilbene scintillators serves as the rearward scatterer for the neutron camera and the forward scatterer for the gamma camera, thereby providing a dual species camera.

While a neutron camera comprised of all organic scintillation detectors can detect gamma rays, it is done with greatly compromised quality. Similarly, a traditional gamma camera can detect neutrons but inefficiently and with compromised resolution.

The detectors 34 in a preferred embodiment use solid organics such as plastic and stilbene in the first two plates instead of a liquid such as mineral oil. This is because of ruggedness requirements for field work. The second attribute is that of so-called pulse shape discrimination (PSD), meaning that the nanosecond shape of the signal from the detectors can be used to identify whether the scattering particle is a gamma ray or a neutron. It is very beneficial to have at least one plate of either type of camera comprised of scintillation detectors with this property.

The system 20 is designed with the material in the detectors 34 of the first plane 24 being a plastic scintillator with no pulse shape discrimination properties. The detectors 34 of the second plane 26, which serve both the neutron and gamma cameras, are comprised of an organic crystal, called stilbene. Stilbene possesses pulse shape discrimination properties.

Finally, the detectors 34 of the third plane 28 are comprised of an inorganic crystal, such as NaI, that does not possess PSD.

The complete system 20 has optimized sensitivity for both species of particles, while minimizing the total amount of hardware and the electronics. Being all in the solid state it can be made rugged and still possess excellent resolution and sensitivity for both species.

With the system 20 described, some of the underlying theory is described. Neutrons have no charge, and therefore do not readily interact. Thus, neutrons must be detected by indirect methods. A preferred method for neutron detection at MeV energies exploits the large elastic n-p scattering cross section. The choice material, serving the functions of neutron scatterer and recoil proton detector, is an organic scintillator. This material consists of mainly hydrogen and carbon, in the number ratio of 1.0 to 2.0. The relative concentration of hydrogen varies with scintillator type.

To perform imaging, an incident neutron must undergo an n-p scatter in each of two detectors. One must be able to follow the path of the neutron once it enters the instrument, measuring the location, relative time, and energy deposits of each n-p interaction.

Figure 2:
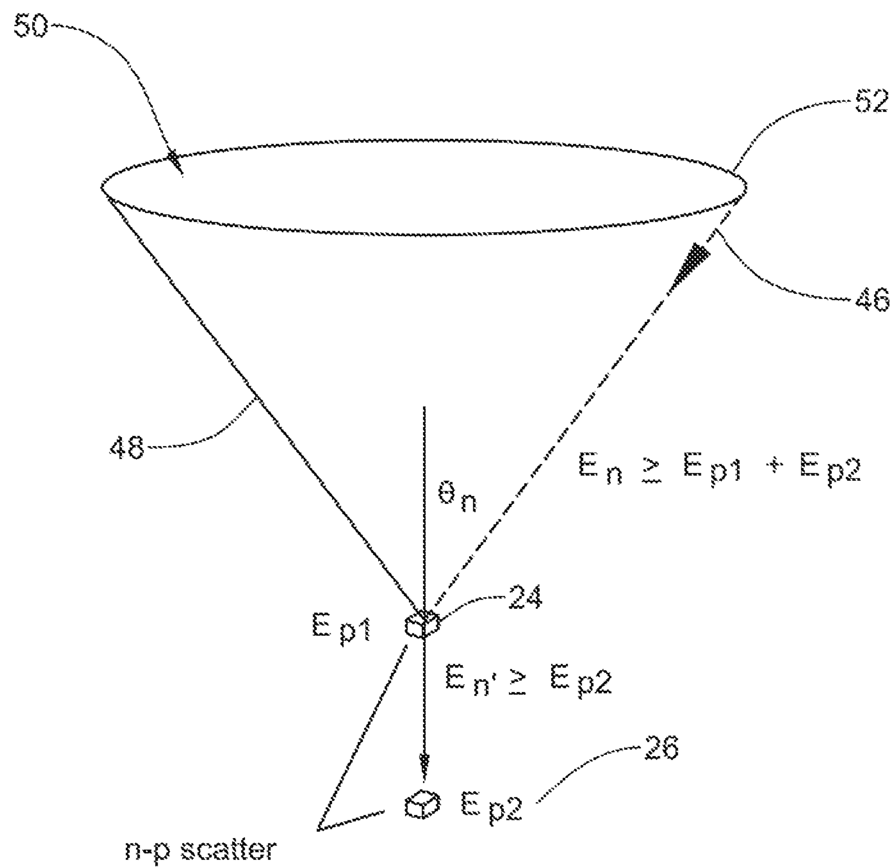
FIG. 2 is a schematic view of neutron double-scatter kinematics.

Referring to FIG. 2, a schematic view of neutron double-scatter kinematics is shown. A neutron 46, whose incident direction is unknown, undergoes two n-p scatters by detection by detectors 34, such as shown in FIG. 1, to obtain information regarding the source. By measuring the spatial coordinates of the two interactions and time of flight (ToF), the energy and direction (i.e., momentum vector) of the scattered neutron is determined. By measuring the energy of the first recoil proton, the energy of the incident neutron as well as the scatter angle can be computed.

With this information one can constrain the incident neutron direction to lie on the mantle 48 of a cone 50 about the recoil neutron velocity (as seen in FIG. 2). The scatter angle $\sin^2 \theta = E_p/E_n$. By projecting the cone 50 onto an object plane or sphere, one has an event circle 52 for each event, also shown in FIG. 2. From the intersection of multiple event circles, through statistical means it is possible to obtain an image of a neutron source.

Still referring to FIG. 2, in a preferred embodiment the detectors 34 in the first plate 24 are made up of 1 inch cylindrical cells of plastic scintillator, read out by fast, rugged 1 inch photo multiple tubes (PMT). The detectors on the second and third layer are likewise made up of 1 inch cells read out by similar PMTs. In contrast to the plastic scintillator of the first plate 24, the second plate 26 is stilbene and the third plate 28 is inorganic such as sodium iodide (NaI). The detectors 34 on the second plate 26 are capable of pulse-shape-discrimination (PSD). Pulse shape discrimination (and Time-of-Flight (ToF)) allows the system to reject or distinguish gamma rays, important for high background environments.

Figure 6:
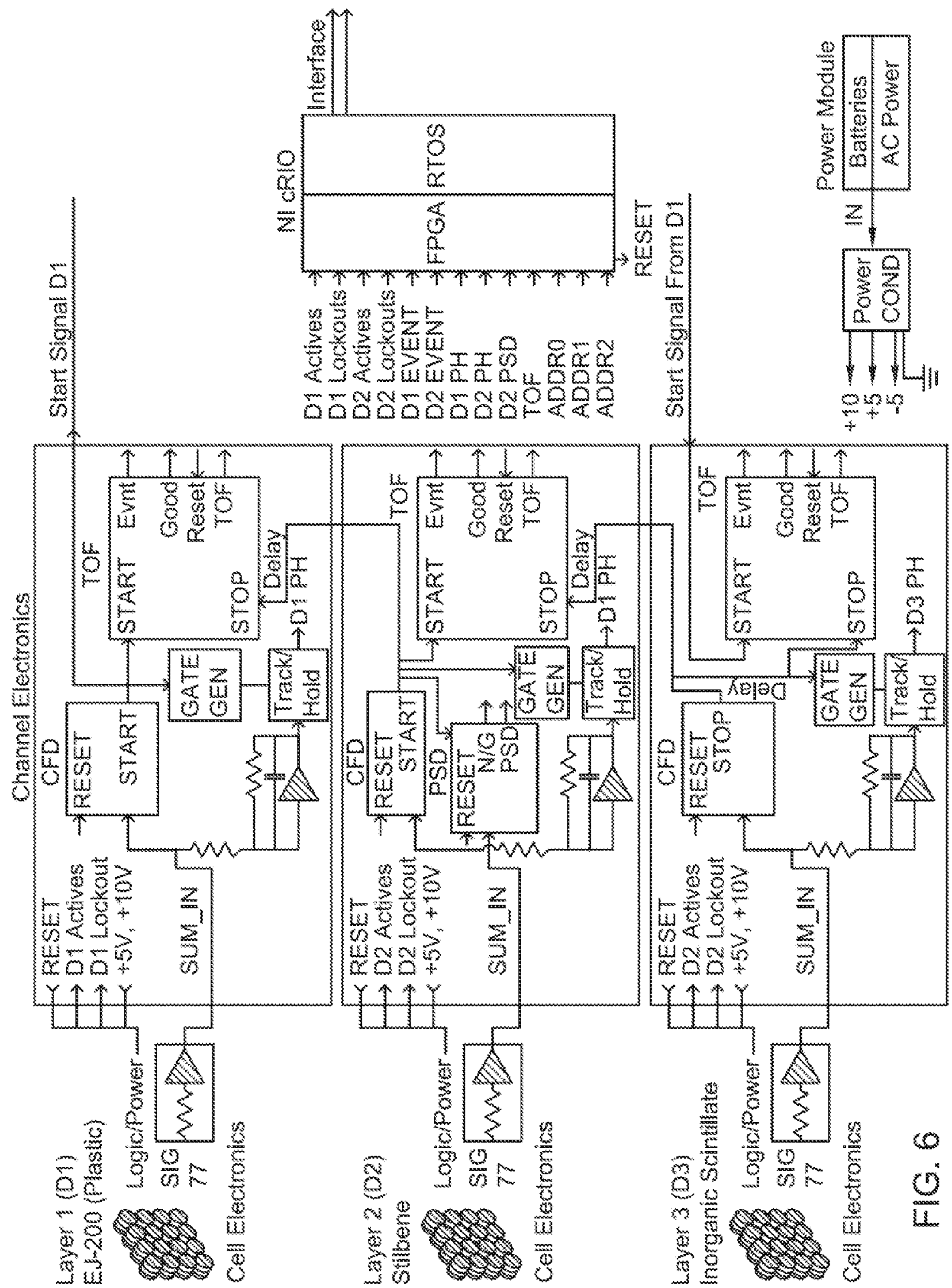
FIG. 6 is a block diagram of the three plane system.

With some of the underlying theory described, the method of detection, as shown in the block diagram of FIG. 6, is described. Time-of-flight measurements are made between plates 24, 26 and 28. All cells or detectors 34 represent independent data channels. When a neutron interacts with a detector 34 in the first plate 24 analog signals from that detector plate are generated from the analog sum of the different cells in first plate 24. Those signals initiate the ToF measurement, create a fast logic signal to test for time coincidence with what happens in the second plate 26, and serve as an analog pulse height for the energy deposited by the neutron in the first plate 24. The cell identification is taken to be the interaction location, i.e., a spatial resolution of 1 inch corresponding to a particular detector. Multiple signals from different detectors 34 in the first plate 24 are rejected.

Similar signal processing takes place in the second plate 26, where the sum signal stops the ToF measurement and the cells that trigger are identified and recorded.

The stilbene detectors 34, an organic scintillator, of the second plate 26 possesses pulse-shape-discrimination properties. This property of the scintillator produces analog signals that can be used to identify whether the ionizing particle is either fast (electron, muon) or slow (proton or heavy ion). The two types of particles differ in their detailed pulse shape—a function of the chemistry of the scintillator. Neutron-initiated events can thus be identified and selected for further data analysis. Electron ionization pulse shapes are generally discarded.

In a preferred embodiment, the two plates 24 and 26 are separated by 30 cm, scintillator to scintillator. A gamma ray over this distance registers a 1 ns ToF, while a 1-MeV neutron requires ~30 ns to cover the same distance. Oblique trajectories yield longer ToF values, but this effect is corrected with the event location information provided by the cell identifications. The ToF range is of order 50 ns, extending above and below typical fast neutron speeds. By having a longer ToF range, one automatically obtains a measure of the accidental coincidence rate—an important measurement in hot radiation environments.

As indicated above, in one embodiment the system 20 is designed to be portable. In an embodiment, the system 20 is designed to operate eight hours on battery power with each plate populated with 77 detector cells. Referring back to FIG. 1, a battery pack 38 is carried by the frame 22. Analog data are processed in an on-board computer, which is part of the electronic and processing unit 30, digitized and formatted for transmission to a remote computer for real-time monitoring or analysis and/or data archiving. The connection between the on-board and remote computers can be by ethernet cable or wireless communications.

The instrument is controlled through the remote computer, nominally a laptop computer running LabVIEW™ marketed by National Instruments. The remote computer also monitors many housekeeping parameters, such as temperature, voltages, count rates in all detector cells and other rates, important for assessing instrument behavior and performance. Gains in the photo multiple tubes (PMTs) are commandable. The detector cell plates are sprung to absorb shock during transit.

A prototype of the system 20 was built with three cells in each plate. A test of the system 20 to measure neutrons with the first plate 24 and the second plate 26 was also (1) a test of the performance on the electronics for each plate simultaneously to process signals from multiple cells and (2) a test of the ability to trim the gains and thresholds of six cells, so that they acted like a single instrument with minimal dispersion in the spectrum and image because of gain and threshold variations. The nine cell-pair combinations in the first two plates 24 and 26 should behave as one when each cell is properly adjusted and trimmed. For the exercise, a $^{252}$Cf source was placed on axis at a distance of 3.4 m.

Figure 3:
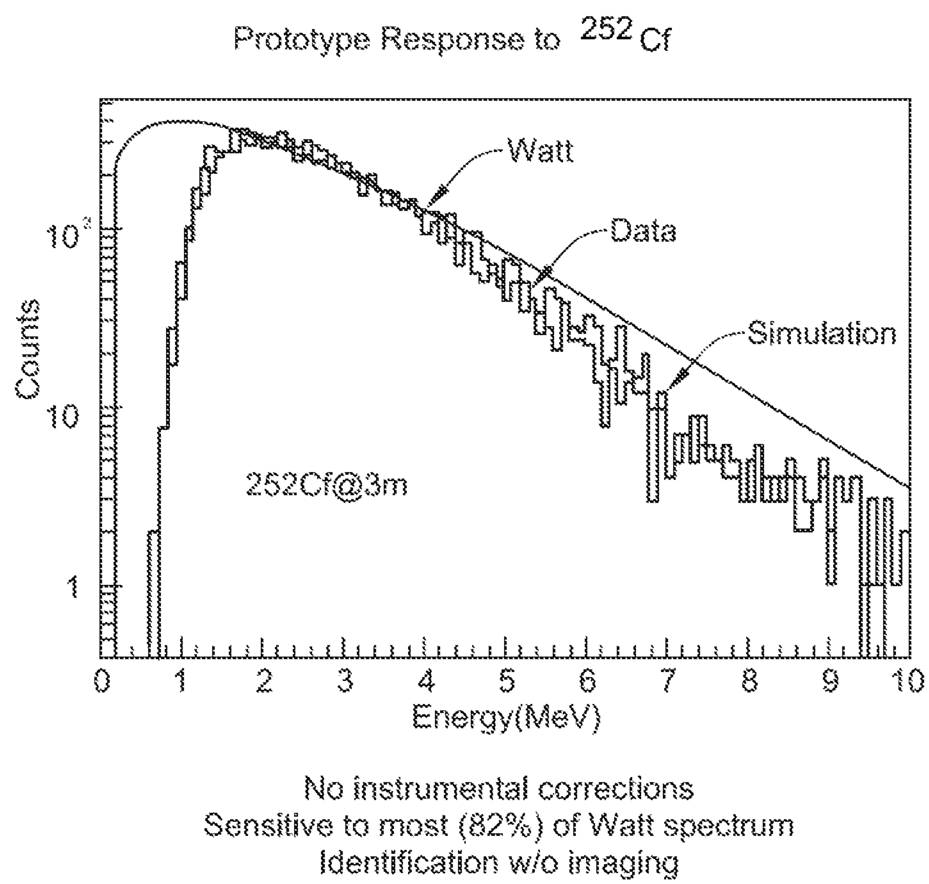
FIG. 3 is a graph of system response to $^{252}$Cf (Californium)
Figure 4:
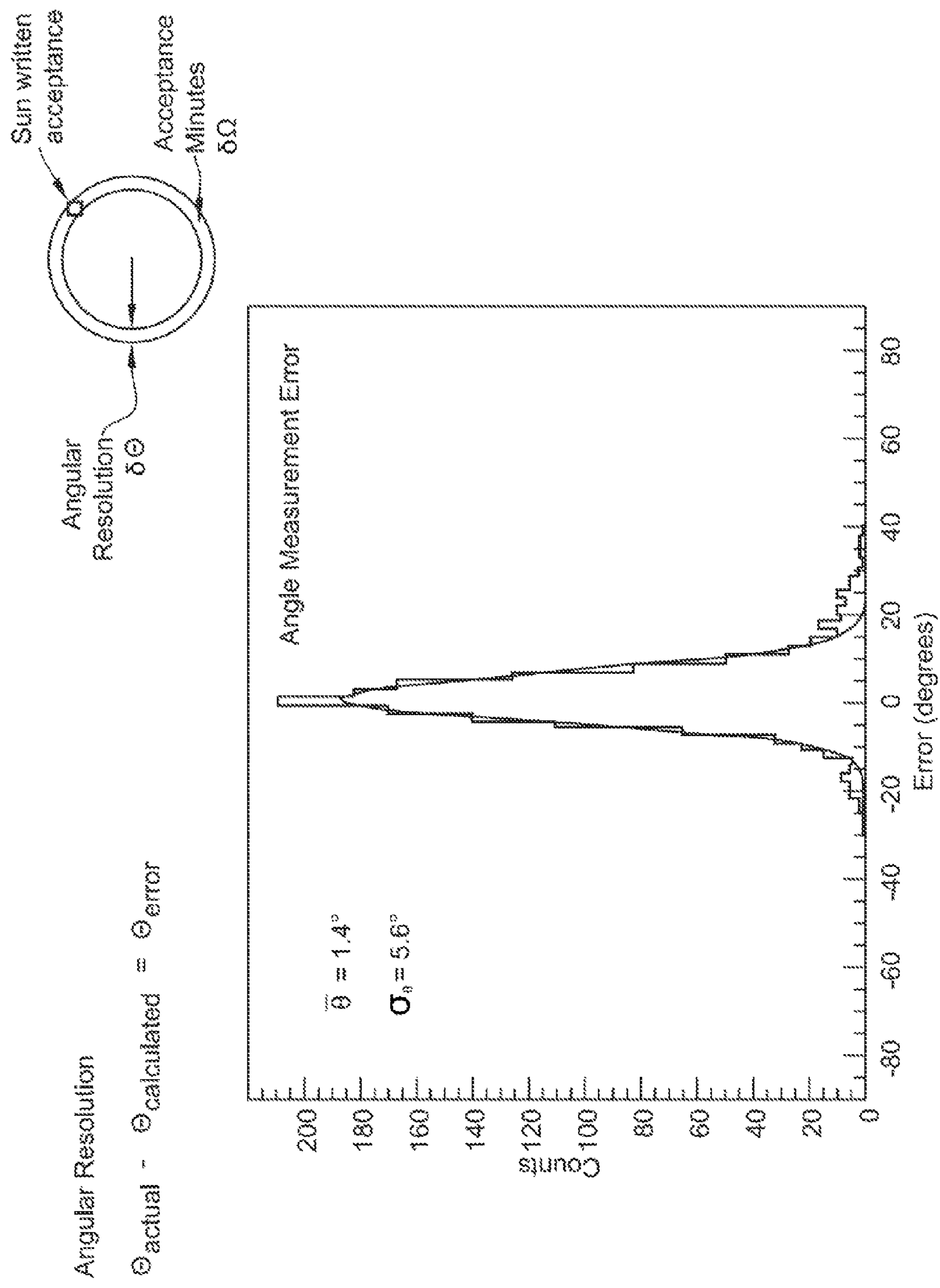
FIG. 4 is a graph of angular resolution.

Referring to FIG. 3, a graph of system response to $^{252}$Cf (Californium) is shown. A graph of angular resolution is shown in FIG. 4 and particularly an angular resolution measurement (ARM) for the 3×3 cumulative combination is shown. The neutron trajectory for each combination of cells is different and each kinematically measured scattered angle must agree with the scatter angle measured by simple geometry. The ARM function is the difference of those two angles per neutron event. The width of this distribution is ~12° (FWHM), somewhat larger than that measured with only two cells (10° FWHM). This is probably due to small variations in the gains of the detectors 34 in the first plate 24 or the time-of flight (ToF) calibrations. The non-gaussian wings on the ARM distribution arise from neutron events near the threshold of detection, i.e., 50 $keV_{ee}$ in either the first plate 24 or the second plate 26, as seen in FIG. 1, or equivalently neutrons from approximately 300 keV to 700 keV.

To measure the spectrum of the neutron source, events were selected for which the measured scatter angle was within 20° of the true angle. The results, i.e., count spectrum, is shown in FIG. 3.

The important feature to note here, but not readily seen, is the far greater number of counts per unit live time compared to the two-cell experiment. This is due to the 9× larger effective area compared to the two-cell configuration. The exponential Watt shape is still recovered and is smoother due to the greater statistics.

Figure 5:
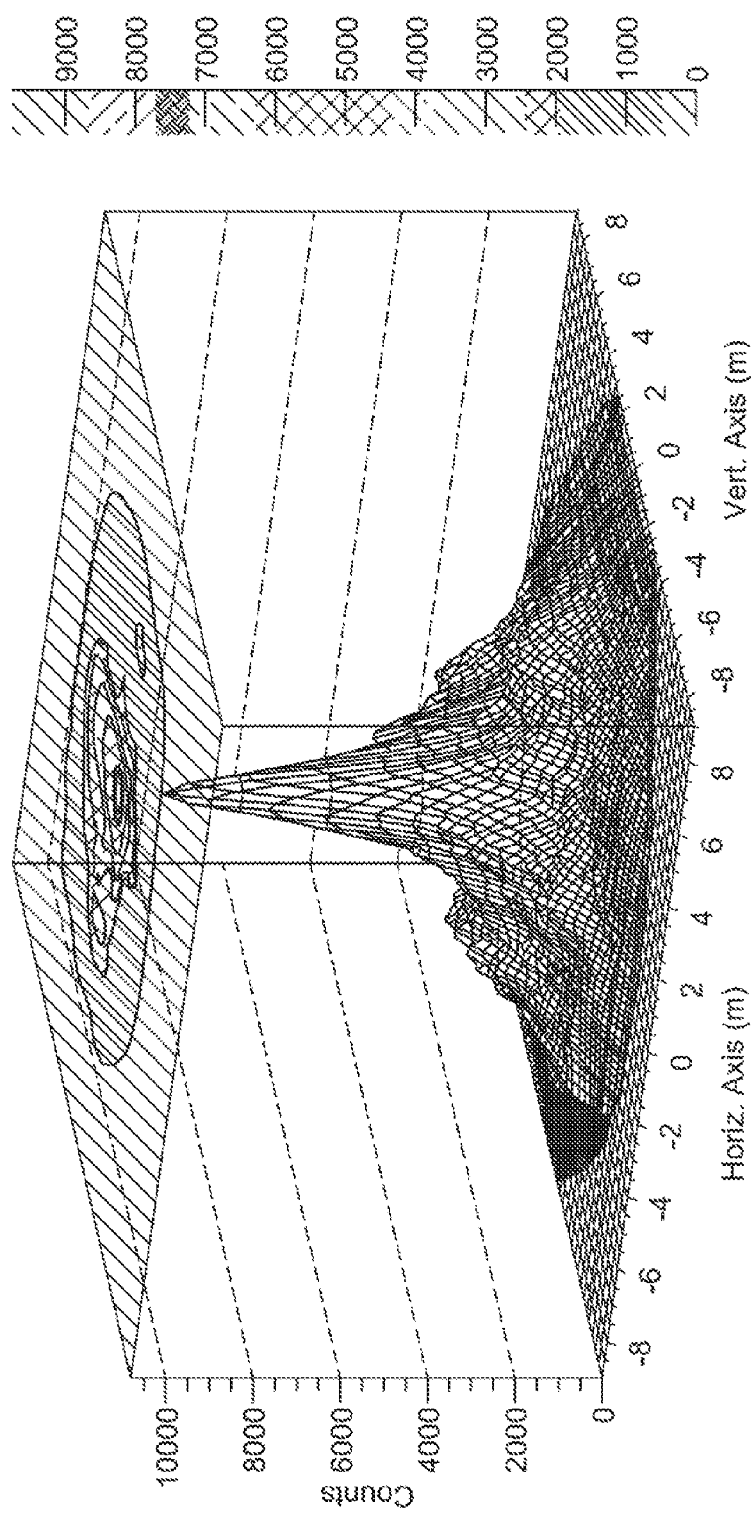
FIG. 5. is a graph of $1^{st}$ order imaging of a $^{252}$Cf source at 3 meters.

Lastly, the imaging capability can now be examined with many (nine) different cell geometrics with correspondingly different event cone axes, allowing event circles to intersect. The 3-D plot of the circle intersection density is shown in FIG. 5. No ARM cuts were applied to construct this plot. ARM cuts are only applied to construct the energy spectrum once the source position is known.

A strong central peak in FIG. 5 is present in the image plate corresponding to true location of the source. However, there is considerable structure outside the central peak. This structure arises from the correlated circle intersections from the presence of a point source. They are most apparent when the number of cell pairs is small, i.e., nine in our case. With a fully populated instrument, the cell pair count grows to 5900 and these lobes or ghost images will disperse, while the central peak grows in proportion to the effective area, i.e., proportional to the number of cell pairs.

This system or instrument 20 is particularly useful in mixed radiation environments, but typically neutron environments are also rich in gamma rays. The motivating application is for security use, either by the DoD or DHS or any number of agencies responsible for identifying fissile or radioactive material. One example is a state police force responsible for monitoring or screening traffic in and out of a major city.

However, the nuclear power industry could also find a dual species instrument useful for monitoring nuclear fuel and any associated gamma-ray emission.

The DHS use envisioned is one where a neutron emitting quantity of material is cloaked in other materials. A dual species camera can not only identify the source of the neutron emission but also identify the gamma-ray emission induced by the presence of neutrons. The gamma-ray emission carries with it signatures of the material cloaking the neutron source, e.g., plutonium. The most exciting example is that the neutron emission excites nitrogen nuclei in surrounding high explosives (rich in nitrogen). The neutrons may not be seen directly, but the characteristic signatures of nitrogen excitation can still be detected. Any agent could have additional information, not only of the neutron source but also of the surrounding material.

While using the detectors of the second and third plates are preferred for detecting gamma rays, it is recognized that the detectors of the first and third plates can be used. The efficiency of the system is not as high as the embodiment discussed above.

It is also recognized that a first plate with stilbene detectors or other detectors that possess PSD properties could be used with a second plate having both plastic and inorganic detectors. The detectors in the first plate would then provide PSD for both neutron and gamma detection.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A system for imaging and measuring neutrons, the system comprising a frame;

a first plate and a second plate, which plates are parallel to each other and carried by the frame;

an electronic and processing unit;

the first plate and the second plate each carrying a plurality of detectors, wherein the detectors are electronically connected to the electronic and processing unit;

the detectors of the first plate are plastic scintillation detectors;

the detectors of the second plate are stilbene scintillation detectors, wherein the detectors detect a neutron and the electronic and processing unit determines the path of the neutron based on an interaction with one of the detectors of the first plate and then an interaction with one of the detectors of the second plate.

2. A system of claim 1 further comprising a third plate parallel to the first plate and the second plate, the third plate having a plurality of detectors wherein the system images and measures neutrons and gamma rays.

3. A system of claim 2 wherein the detectors of the third plate are inorganic scintillation detectors.

4. A system of claim 3 wherein the inorganic scintillation detectors use sodium iodide.

5. A system for imaging and measuring neutrons and gamma rays, the system comprising a frame;

a first plate, a second plate, and a third plate, which plates are parallel to each other and carried by the frame;

an electronic and processing unit;

the first plate, the second plate, and the third plate each carrying a plurality of detectors, wherein the detectors are electronically connected to the electronic and processing unit;

the detectors on each of the first plate, second plate, and third plate are scintillation detectors, wherein the detectors detect a neutron and the electronic and processing unit determines the path of the neutron based on an interaction with one of the detectors of the first plate and then an interaction with one of the detectors of the second plate; and wherein the detectors detect a gamma ray and the electronic and processing unit determines the path of the gamma ray based on interaction with one of the detectors of the second plate and then an interaction with one of the detectors of the third plate.

6. A system of claim 5 wherein the detectors on each of the first plate, second plate, and third plate are non-liquid scintillation detectors.

7. A system of claim 6 wherein each of the detectors on the third plate is an inorganic scintillation detector.

8. A system of claim 7 wherein each of the detectors on the second plate is capable of pulse-shape discrimination.

9. A system of claim 5 wherein each of the detectors on the first plate is a plastic scintillation detector and each of the detectors on the second plate is a stilbene scintillation detector.

10. A system of claim 9 wherein each of the detectors on the third plate is an inorganic scintillation detector.

11. A system of claim 10 where each of the detectors on the third plate is made of sodium iodide (NaI).

12. A method of imaging and measuring neutrons and gamma rays comprising:

providing a first plate with plastic scintillation detectors, a second plate with stilbene scintillation detectors and a third plate with inorganic scintillation detectors;

detecting a particle by its interaction with the plastic scintillation detectors of the first plate;

measuring the time of flight of the particle from the plastic scintillation detectors of the first plate to the stilbene detectors of the second plate;

determining details regarding the particle based on interaction of the particle with the stilbene detectors of the second plate, including the pulse shape generated by pulse-shape-discrimination (PSD) property of the stilbene detectors of the second plate;

detecting the particle by its interaction with the inorganic scintillation detectors of the third plate; and analyzing data to determine if the particle is a neutron or a gamma ray.

13. A method of claim 12 further comprising maximizing the signal to noise for both the neutron and gamma ray detection base on the PSD measurement.

* * * * *